United States Patent [19]
Martin

[11] Patent Number: 6,000,531
[45] Date of Patent: Dec. 14, 1999

[54] STEERABLE ROTARY DEVICE

[75] Inventor: Merrill D. Martin, Oakland, Calif.

[73] Assignee: Martin Family Trust, Oakland, Calif.

[21] Appl. No.: 08/886,835

[22] Filed: Jul. 1, 1997

[51] Int. Cl.$^6$ ................................................. B65G 23/04
[52] U.S. Cl. ...................... 198/835; 198/806; 198/369.2
[58] Field of Search .............................. 198/835, 369.2,
198/861.5, 370.1, 370.06; 474/101, 113,
107, 123; 193/35 R, 37

[56]  References Cited

U.S. PATENT DOCUMENTS

| | | |
|---|---|---|
| 1,454,657 | 5/1923 | Smith . |
| 1,666,576 | 4/1928 | Lytle . |
| 2,279,887 | 4/1942 | Hathorn . |
| 2,593,158 | 4/1952 | Lorig . |
| 3,052,396 | 9/1962 | Butscher . |
| 3,113,809 | 12/1963 | Eggmann . |
| 3,837,178 | 9/1974 | Hackforth . |
| 4,169,530 | 10/1979 | Fryatt ...................................... 198/835 |
| 4,372,435 | 2/1983 | Bradbury . |
| 4,552,295 | 11/1985 | Smith et al. ........................ 198/807 X |
| 5,133,543 | 7/1992 | Eitel et al. . |
| 5,180,342 | 1/1993 | Van Ee . |
| 5,312,176 | 5/1994 | Crabb ................................. 198/806 X |
| 5,427,581 | 6/1995 | McGrath et al. . |
| 5,810,149 | 9/1998 | Sandberg et al. .................... 198/369.2 |

FOREIGN PATENT DOCUMENTS

| | | |
|---|---|---|
| 0145827 | 6/1985 | European Pat. Off. . |
| 0783055 | 7/1997 | European Pat. Off. . |
| WO96/00856 | 1/1996 | WIPO . |

OTHER PUBLICATIONS

Catalog—Dodge Engineering Catalog vol. 1.1 (Title) (3 Pages) Motion Industries, Inc.

*Primary Examiner*—James R. Bidwell
*Attorney, Agent, or Firm*—James R. Cypher

[57] ABSTRACT

A steerable rotatable member such as a pulley, sprocket or timing gear which can be mounted on a shaft so that the plane of the rotatable member may be positioned at selected angles other than a 90° angle to the axis of rotation of the shaft. A torque transmitting member, commonly in the shape of a planar disc, is used to operatively connect the shaft and the rim of the rotatable member. The disc radially elongates and laterally flexes as the rotatable member rotates. A sleeve member may be used to connect the disc to the shaft. When used as a driver, a key may be used to transmit power from the shaft to the sleeve. The use of an elongated groove in the shaft permits the rotatable member to be adjustably moved to different locations along the axial length of the shaft.

20 Claims, 12 Drawing Sheets

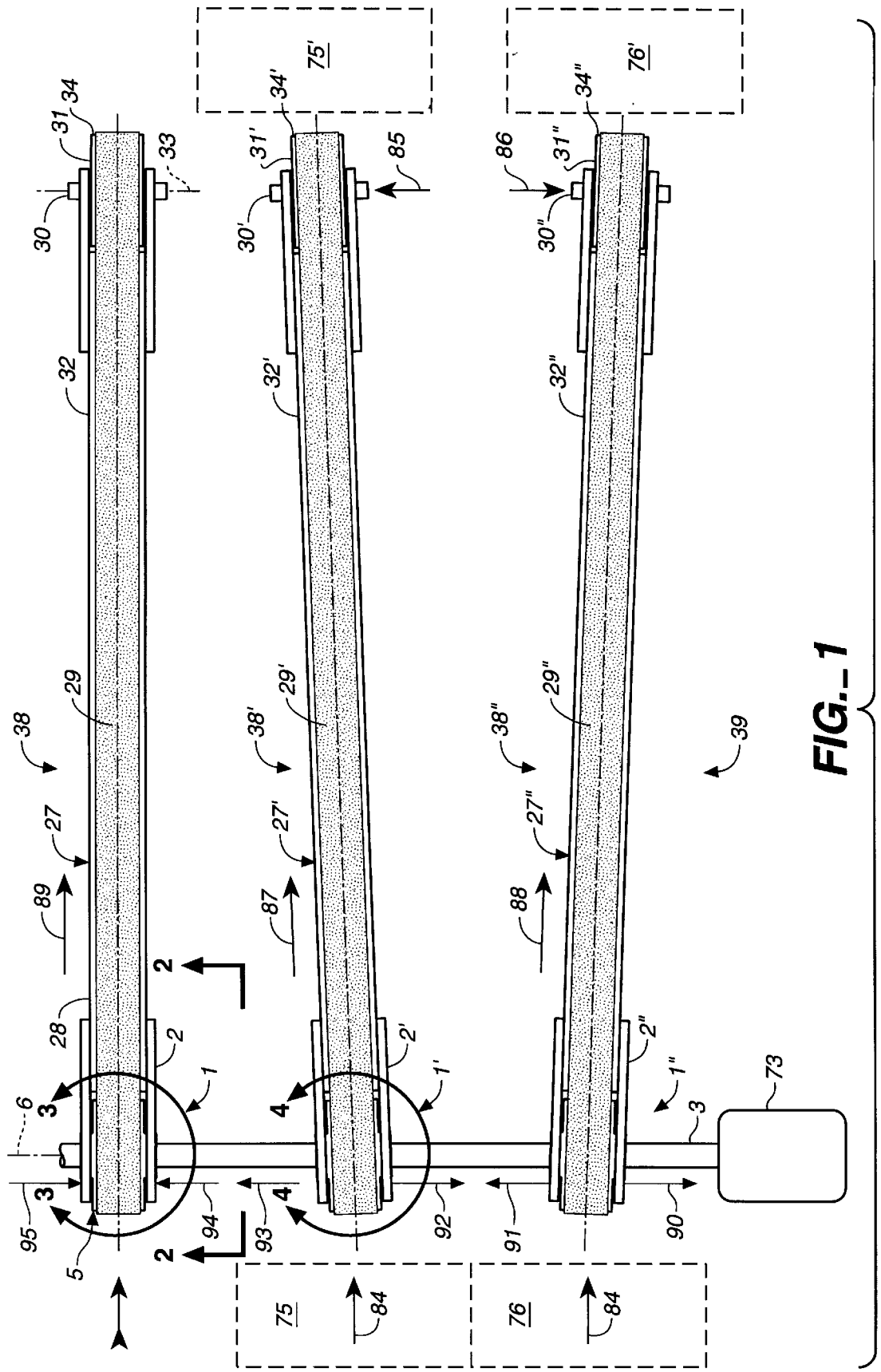
FIG._1

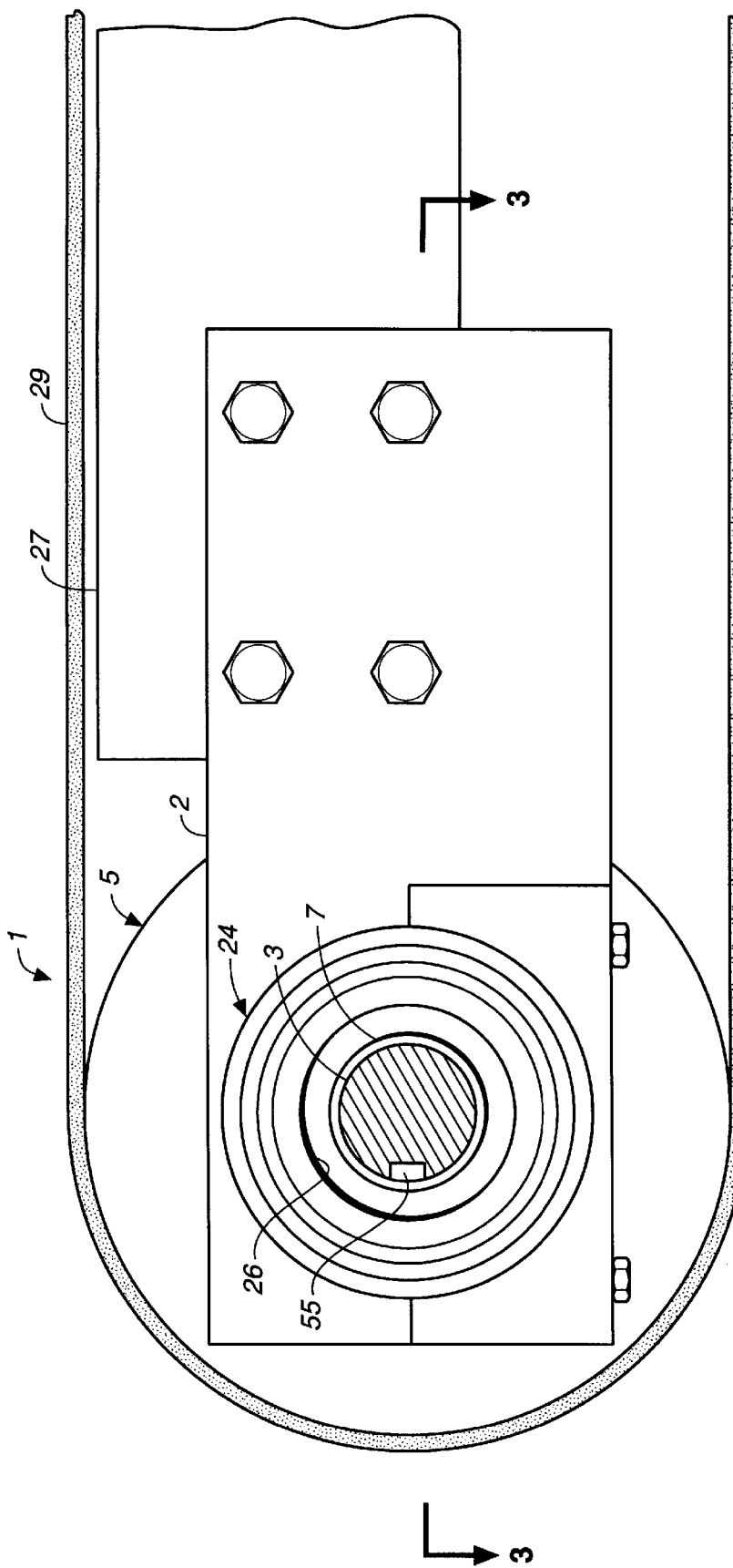
FIG._2

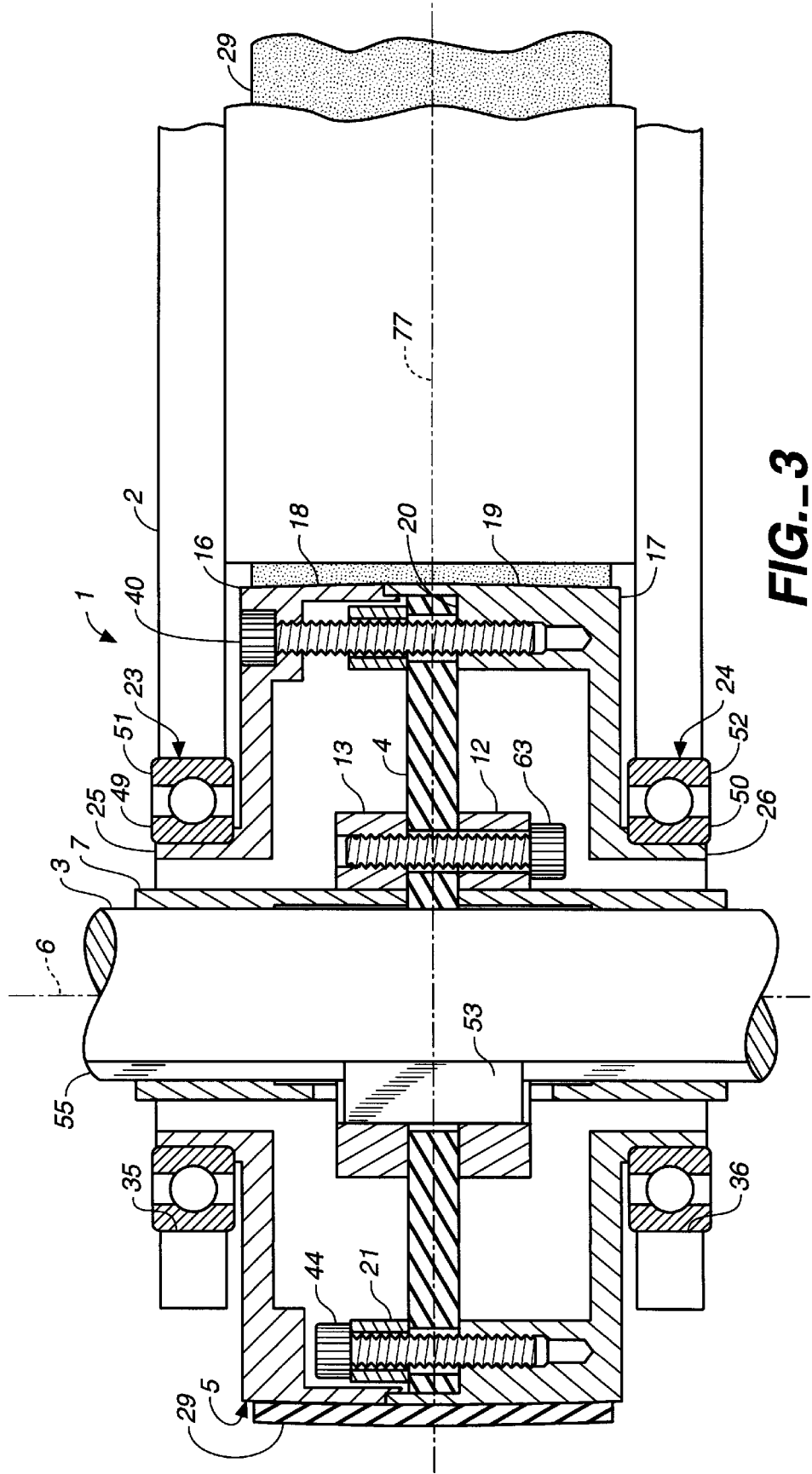
FIG._3

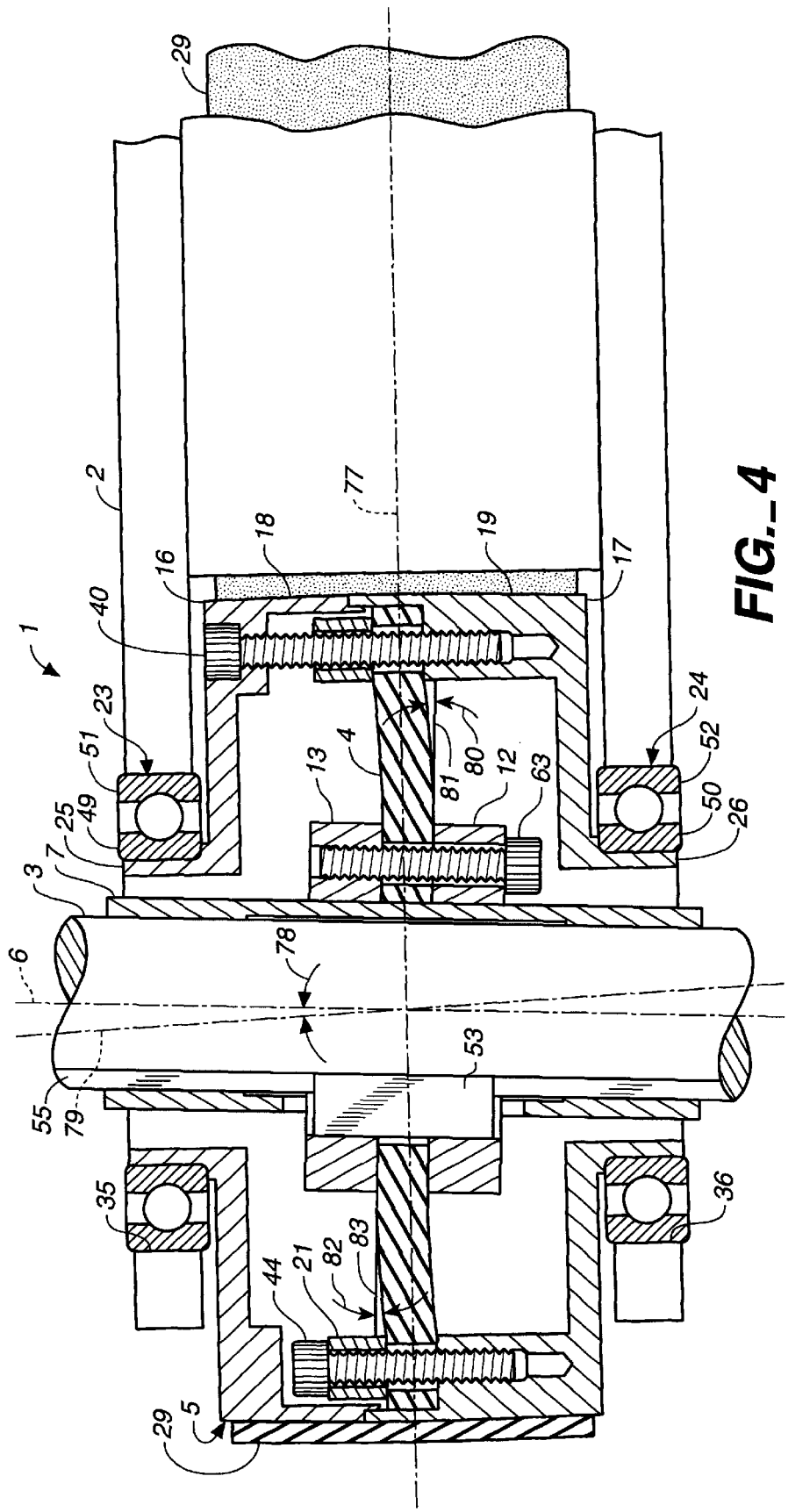
FIG._4

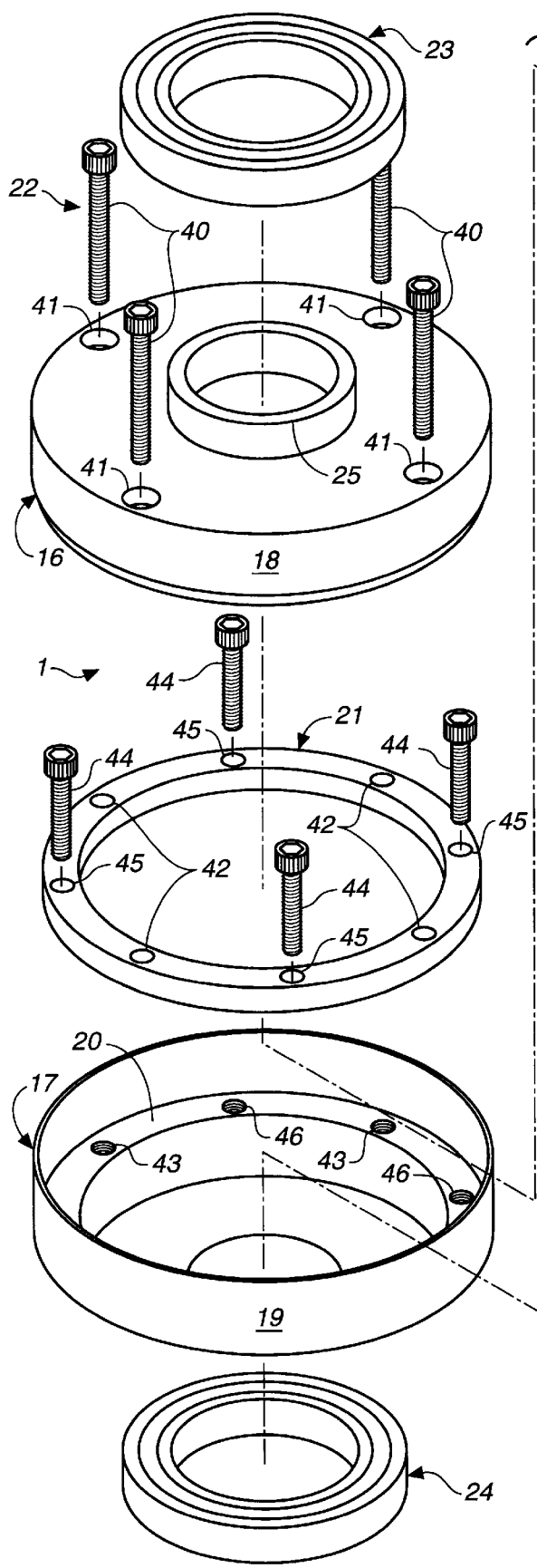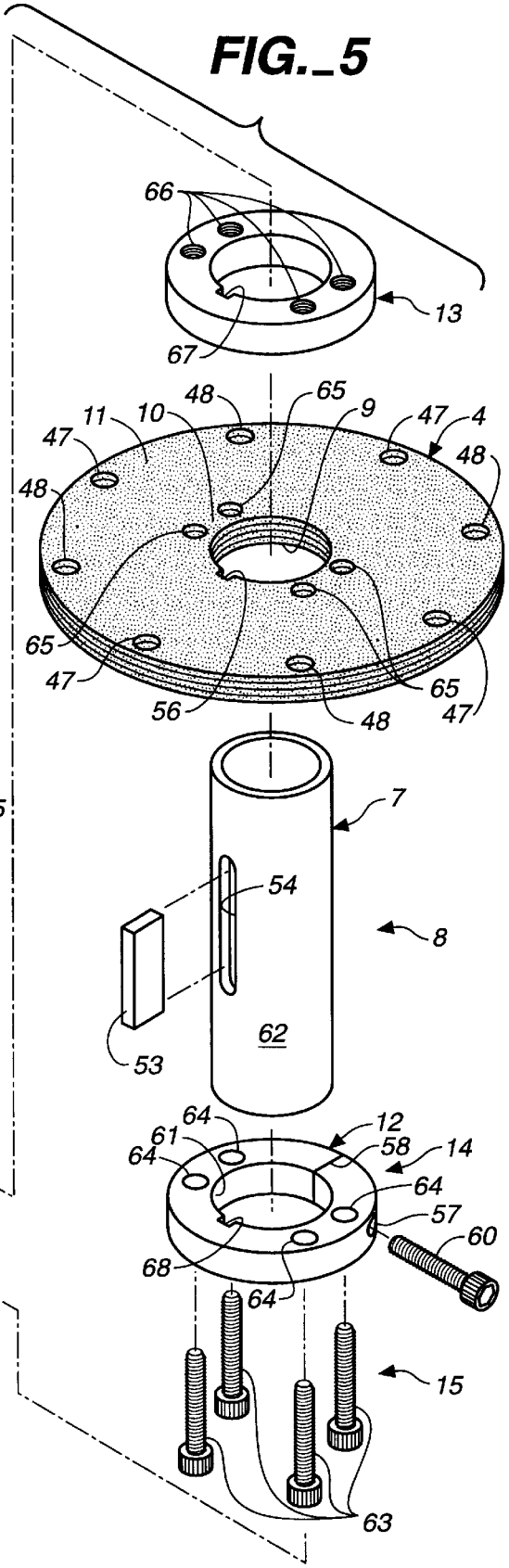
FIG._5

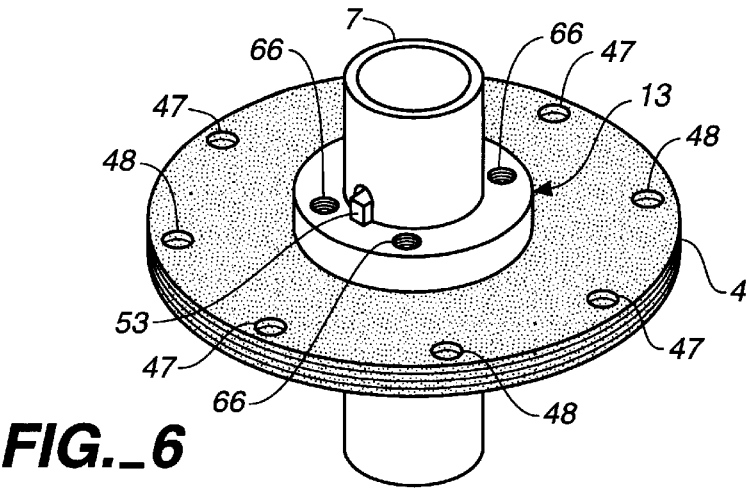
FIG._6
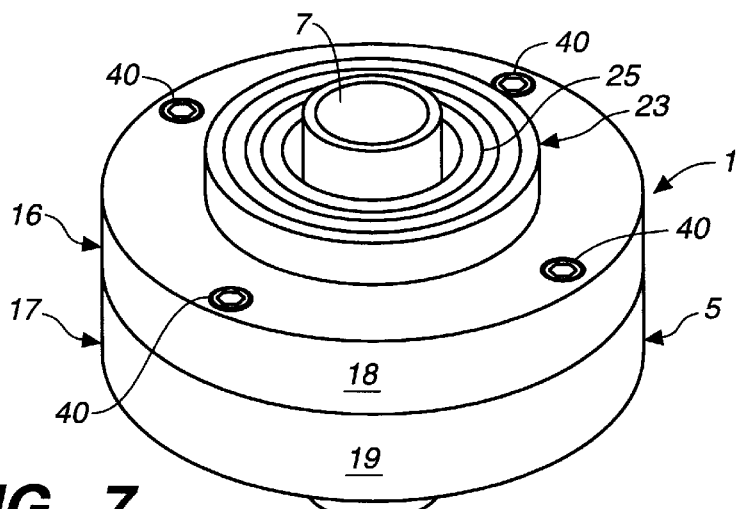
FIG._7
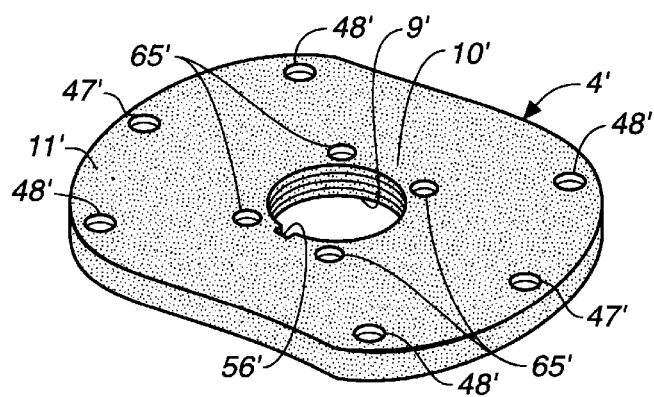
FIG._8

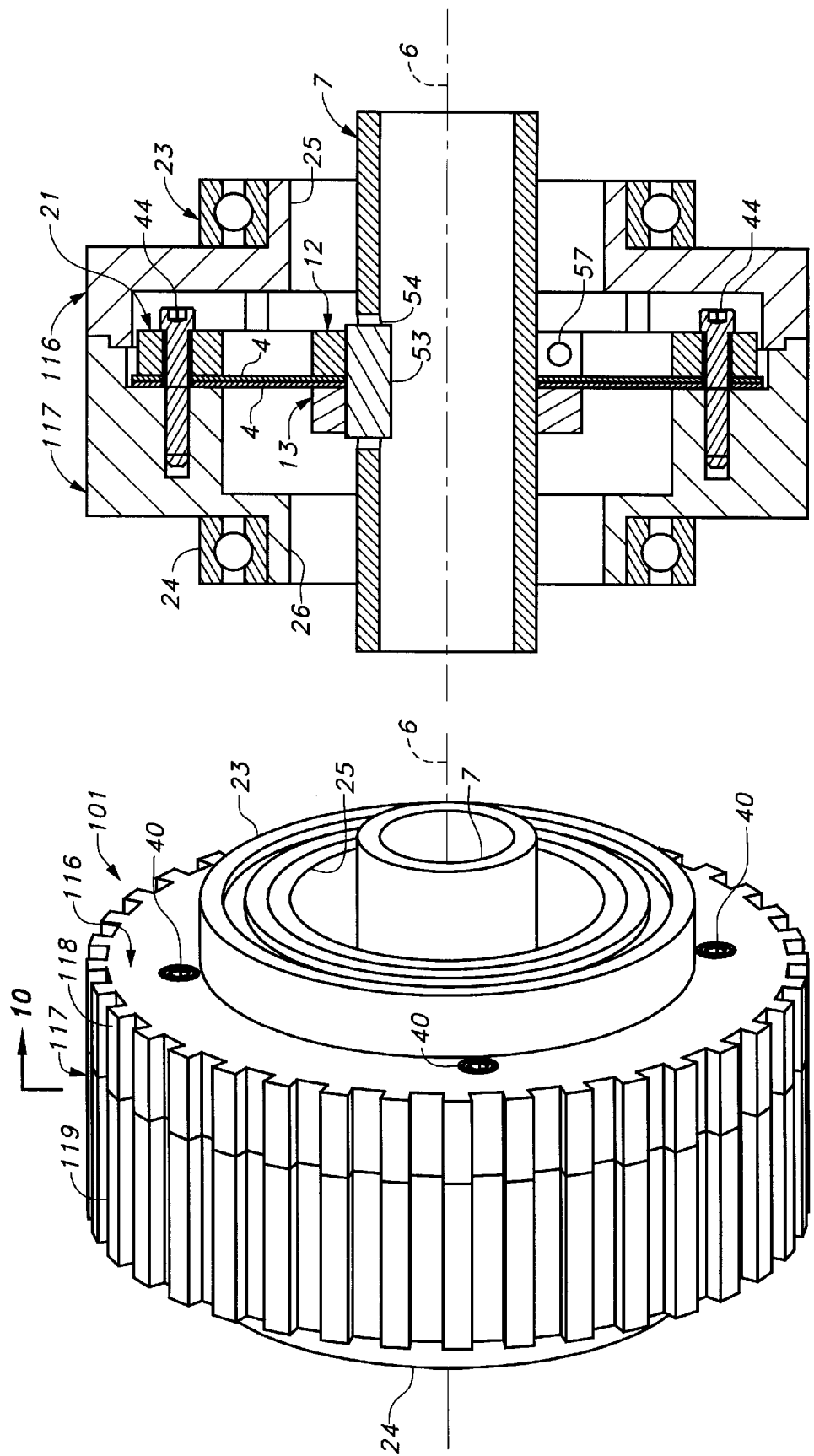

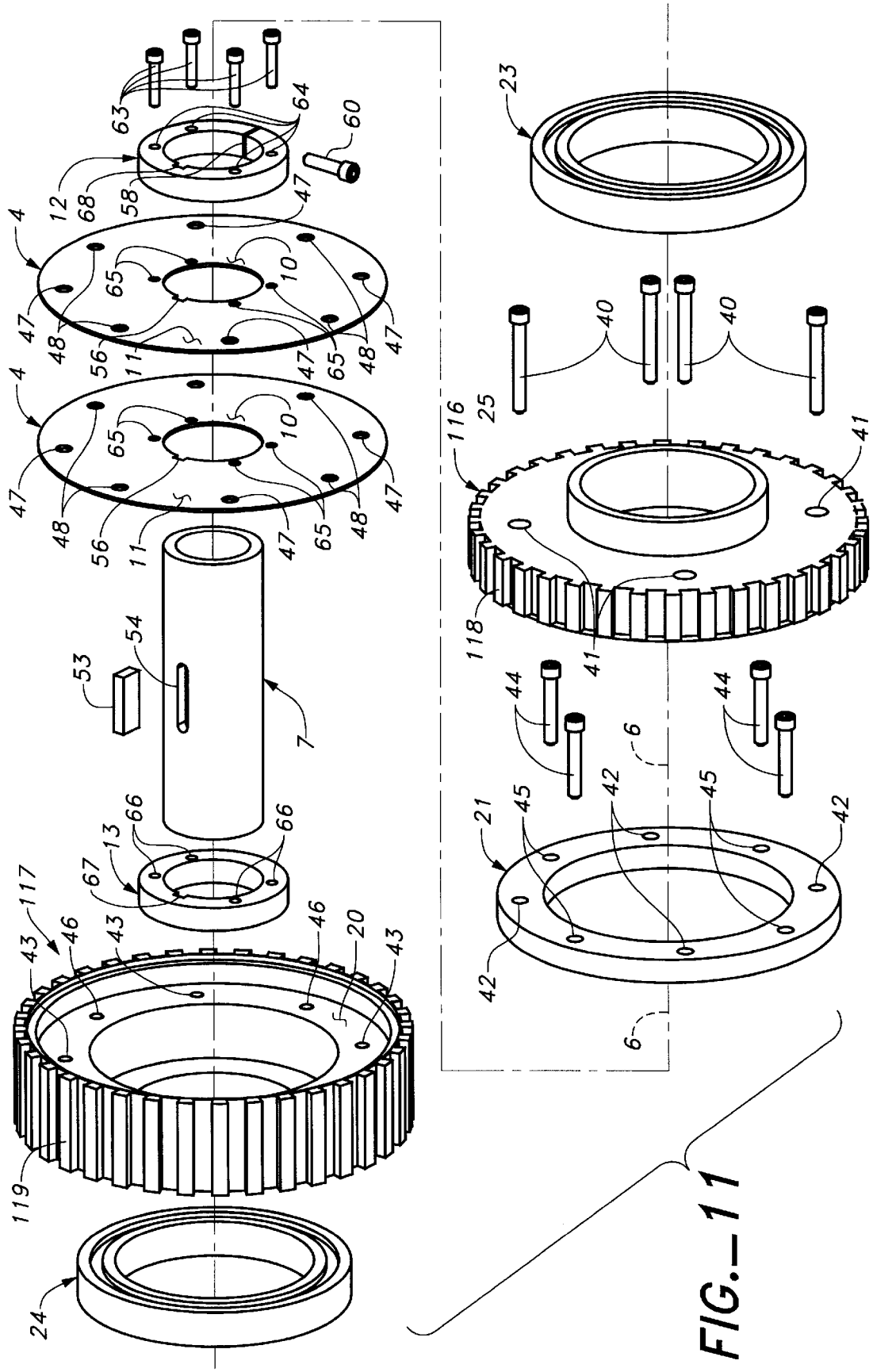
FIG._11

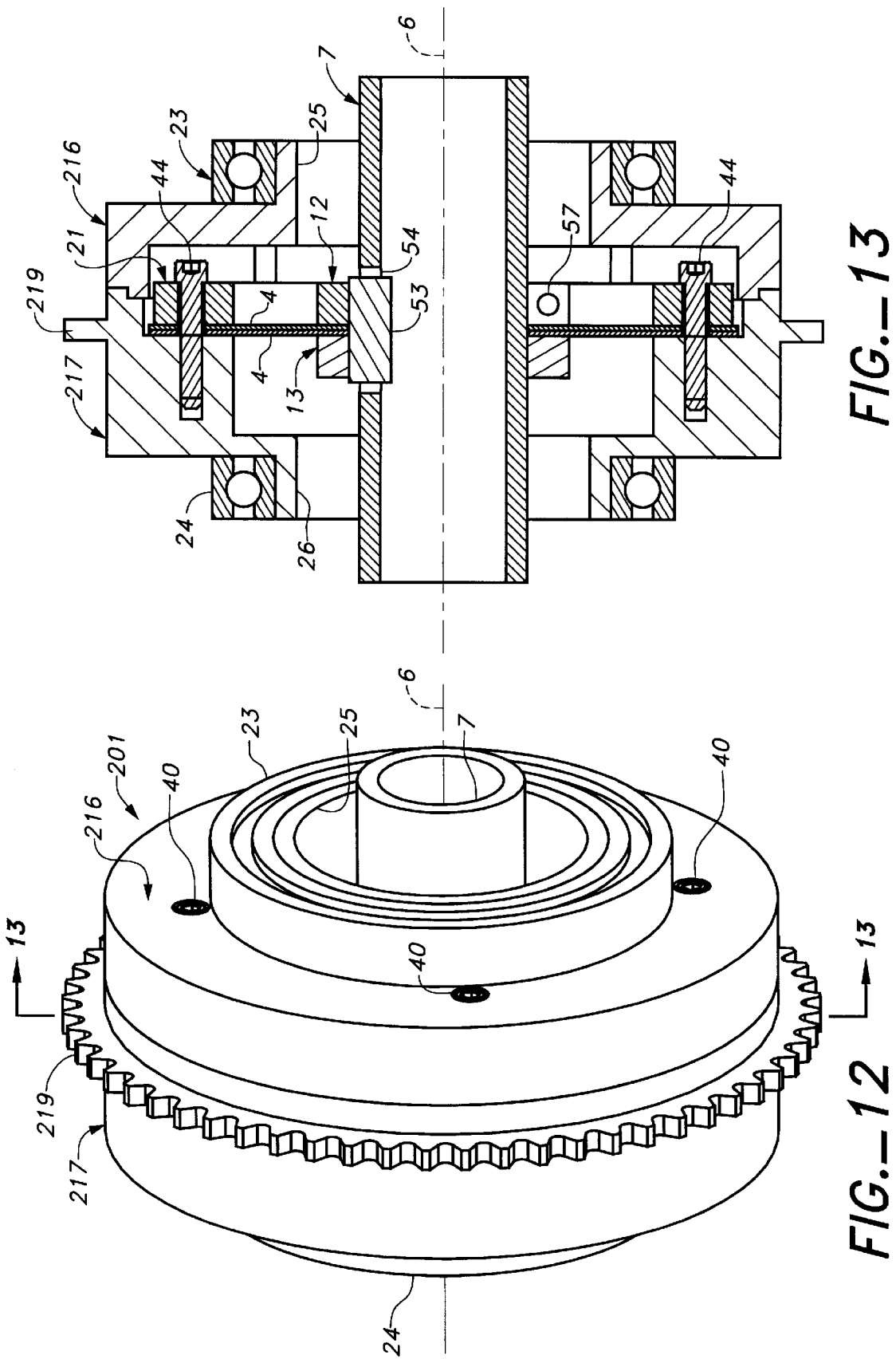
FIG._13
FIG._12

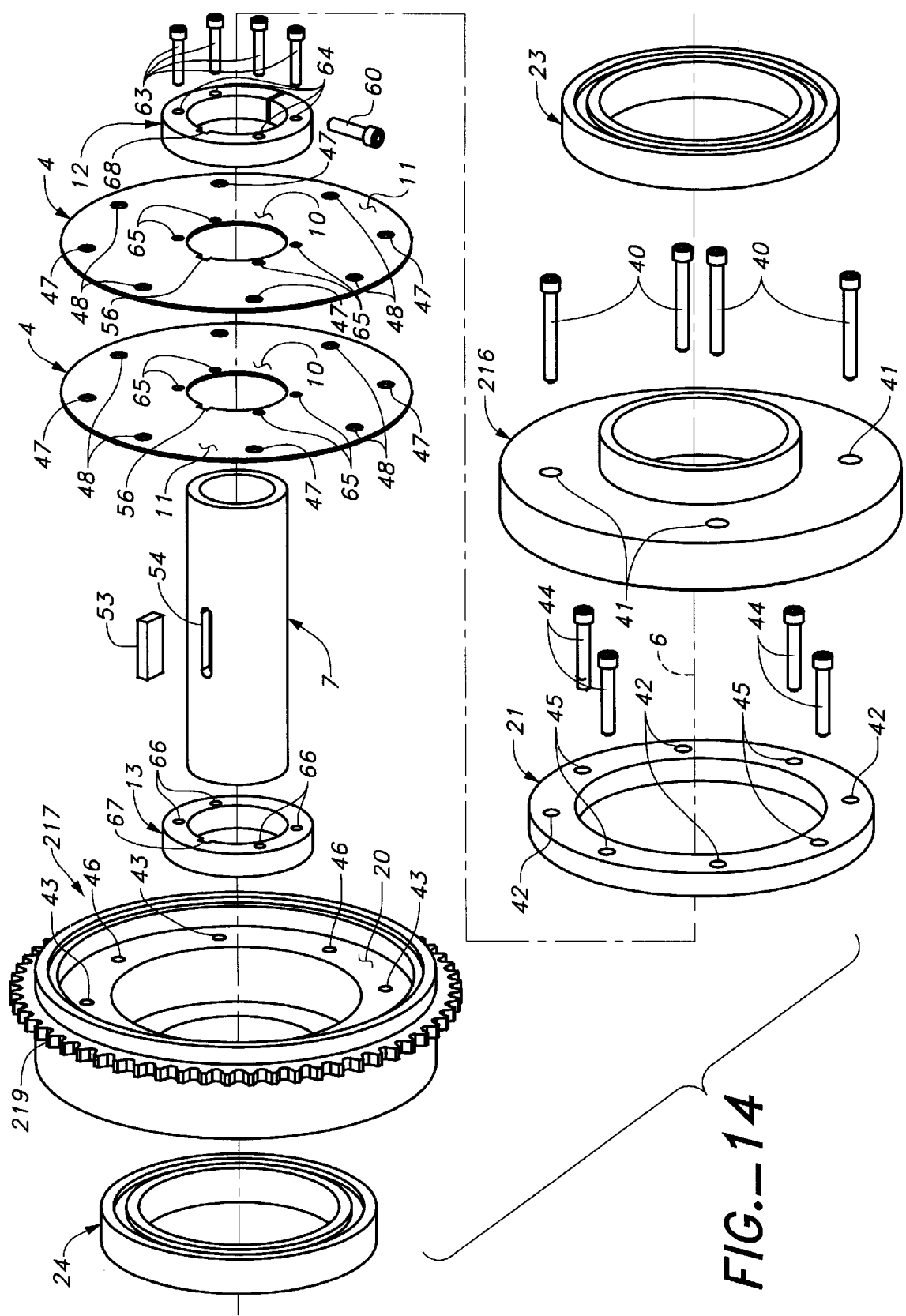
FIG._14

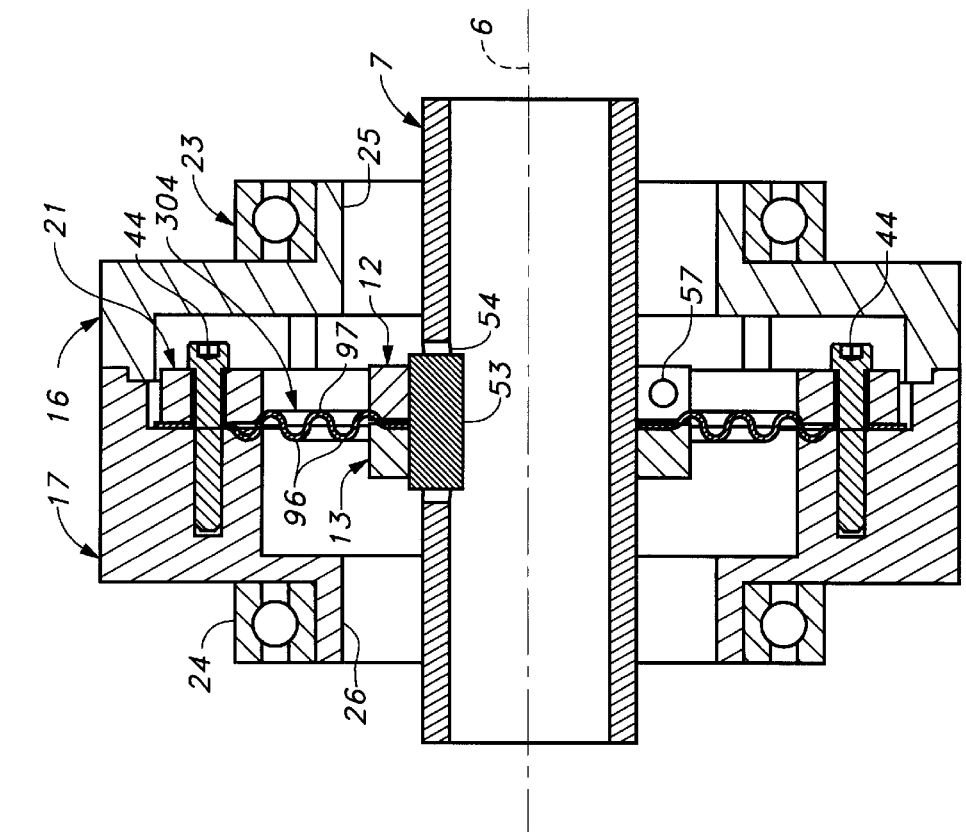
FIG._16
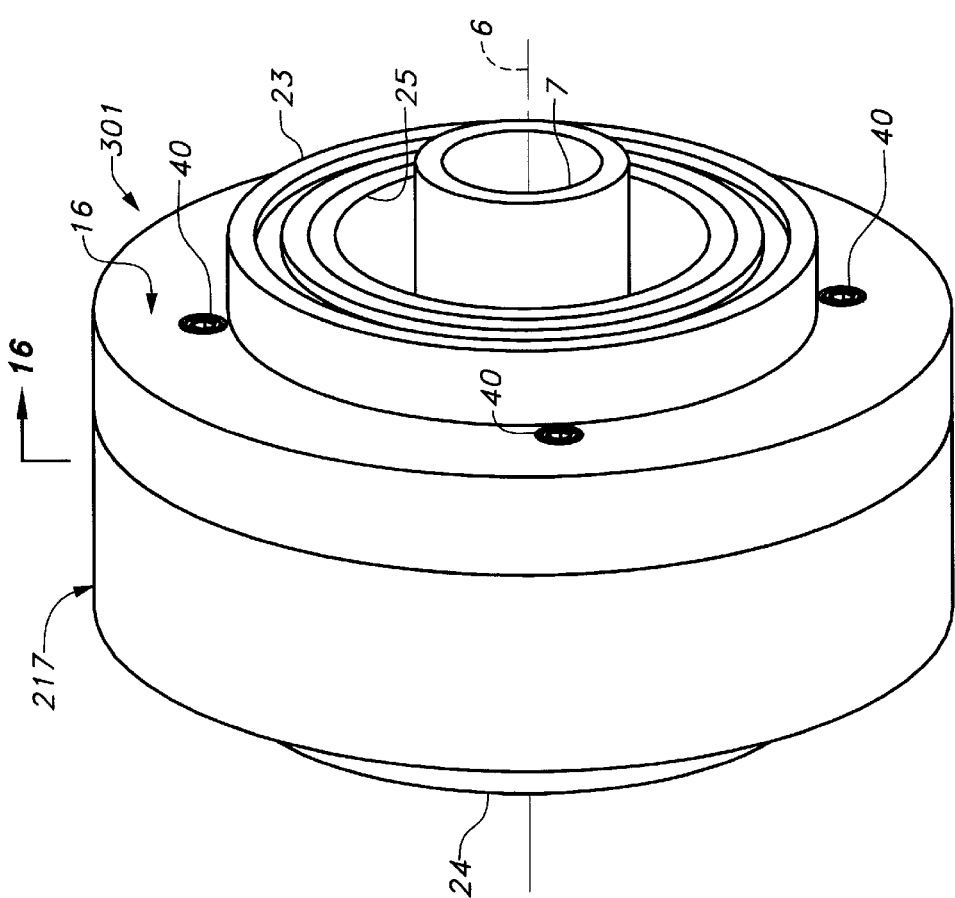
FIG._15

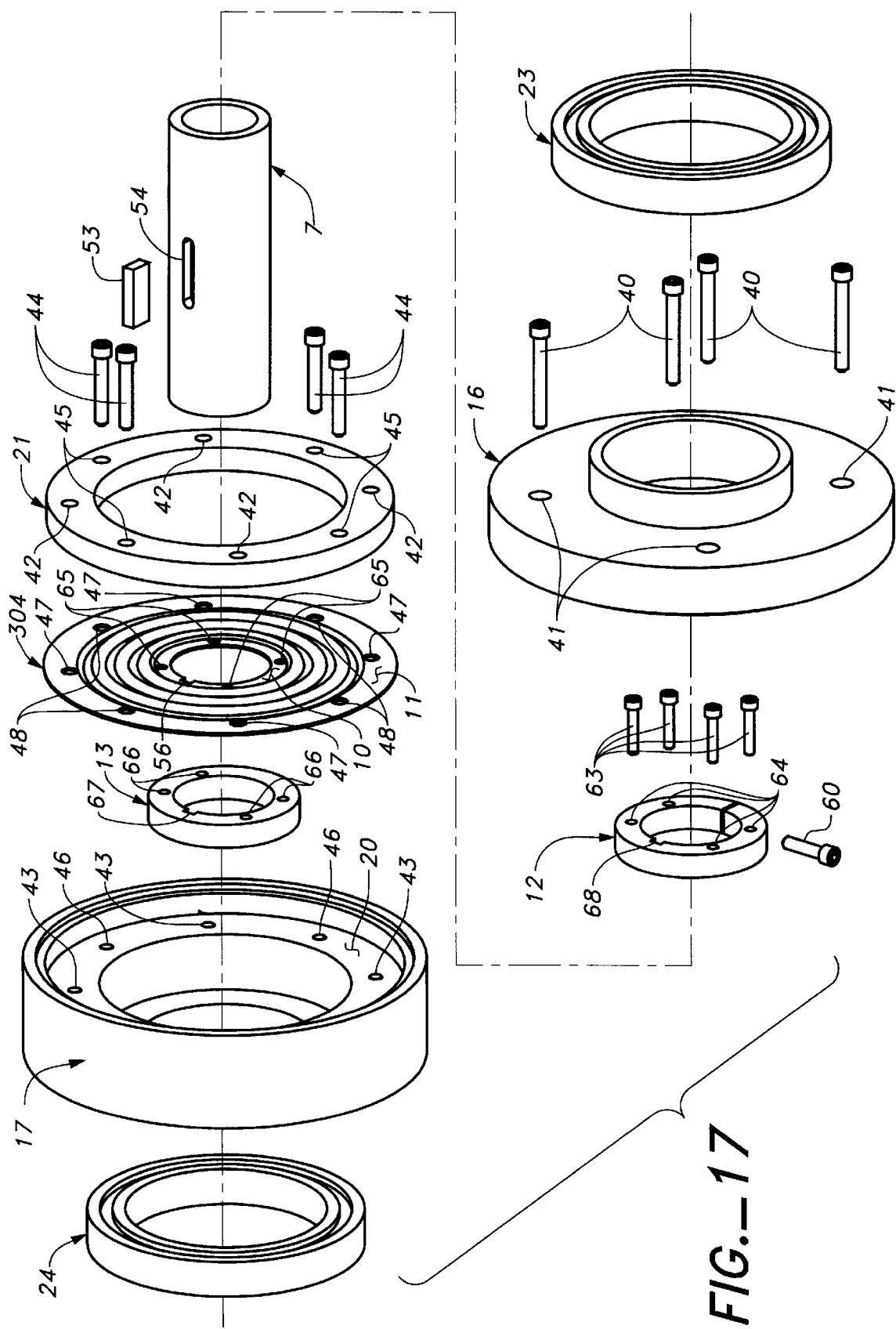
FIG._17

STEERABLE ROTARY DEVICE

BACKGROUND OF THE INVENTION

1. Field of the Invention

This invention relates to a steerable rotary device.

In a steerable rotary device the plane of the rotary device to the axis of rotation of its drive shaft may vary from the standard angle of 90° to varying angles other than 90°.

The rotary device may be a steerable pulley, a steerable chain sprocket, or a steerable timing gear.

2. Description of the Prior Art

In prior art conveyor belt systems where it was desirable to have adjacent belts, chains or timing belts at different angles, a common solution for machines using conveyor belts was to use elastic belts of circular cross section. In such installations, the plane of the driving pulley was offset from the plane of the idler or driven pulley but the planes of both pulleys remained at a 90° angle to the axis of rotation of their respective shafts.

In belt systems where a flat belt was required, a special pulley was needed. In U.S. Pat. No. 1,454,657 granted May 8, 1923 to Smith a steerable driving pulley is described. The considerable apparatus of Smith includes self aligning trunnion bearings and a plurality of metal parts.

SUMMARY OF THE INVENTION

The present invention addresses the problem of how to transmit torque in a rotary device such as a drive pulley, a chain sprocket or a timing gear when the plane of the rotary device is at any of an infinite number of angles to the axis of rotation of the drive shaft. The present invention significantly reduces the number of moving parts and the cost of construction of a driving rotary device by replacing all of the moving parts of prior art steerable drive rotary device with a simple disc which transmits torque from the drive shaft to the rim of the rotary device.

An object of the present invention is to provide a rotary device with an endless member such as a driving pulley in a belt conveyor which will rotate in the same plane as the driven pulley even though the angle of the axis of rotation of the driving shaft is changed from a perpendicular relationship to an angle other than 90 degrees.

Another object of the present invention is to provide a rotary device such as a driving pulley or an idler pulley in which the plane of the pulley may be angled in relation to the axis of rotation of the drive shaft.

A further object is to provide a rotary device such as a drive pulley which can be adjustably slid along the drive shaft.

Still another object is to provide a steerable sprocket in a chain drive.

Still another object is to provide a steerable timing gear for a toothed timing belt.

BRIEF DESCRIPTION OF THE DRAWINGS

FIG. 1 is a schematic top plan view of a conveyor system using the steerable driving pulley of the present invention.

FIG. 2 is an enlarged side view of a portion of the conveyor system illustrated in FIG. 1 taken along line 2—2 in FIG. 1 which includes the steerable pulley of the present invention.

FIG. 3 is a cross sectional view of the steerable pulley of the present invention taken along line 3—3 of FIG. 2.

FIG. 4 is an enlarged cross sectional view of the steerable pulley of the present invention taken along line 4—4 of FIG. 1 showing the pulley in an angularly related position to the drive shaft.

FIG. 5 is an isometric exploded drawing of the components of a preferred form of the steerable pulley of the present invention.

FIG. 6 is an isometric drawing of a portion of the pulley of the present invention.

FIG. 7 is an isometric drawing of the assembled pulley of the present invention.

FIG. 8 is an isometric drawing of a portion of another form of pulley of the present invention.

FIG. 9 is an isometric drawing of the assembled steering timing gear of another form of the present invention.

FIG. 10 is a cross section of the gear illustrated in FIG. 9 taken along line 10—10.

FIG. 11 is an isometric exploded view of the gear shown in FIG. 9.

FIG. 12 is an isometric drawing of the assembled steerable sprocket gear of another form of the invention.

FIG. 13 is a cross sectional view of the gear shown in FIG. 12 taken along line 13—13.

FIG. 14 is an isometric exploded view of the steerable sprocket gear shown in FIG. 12.

FIG. 15 is an isometric drawing of the assembled steerable pulley of still another form of the invention illustrated in FIG. 16 and FIG. 17.

FIG. 16 is a cross sectional view of the pulley shown in FIG. 15 taken along line 16—16.

FIG. 17 is an isometric exploded view of the steerable pulley shown in FIG. 15 and FIG. 16.

BRIEF DESCRIPTION OF THE INVENTION

The present invention consists briefly of a steerable pulley 1 including a rotatable mounting member such as an axle member or a drive shaft 3; a rim member 5 disposed from the axle member or drive shaft 3 and formed with a force transmitting surface, such as a pulley belt receiving surface 18 and 19; and a rotatable torque transmitting member 4 formed from a material which permits radial elongation and lateral flexing and is connected to the rotatable mounting member and rim member 5.

In one form of the invention, rotatable member such as pulley 1 is mounted for rotation in a frame 2 and operably connected to a shaft 3 in adjustable angular relation thereto and includes: a rotatable transmission member 4 operably connected to shaft 3; pulley 1 is formed with a rim 5 operably connected to rotatable transmission member 4 radially from the shaft 3; and the rotatable transmission member 4 is formed from a material which permits the rotatable transmission member 4 to elongate radially and to flex laterally in relation to the axis of rotation 6 of the shaft 3.

In a preferred embodiment, the rotatable transmission member 4 of pulley 1 is a disc as illustrated in FIGS. 5 and 6, but member 4 may also have other shapes; one of which is illustrated in FIG. 8. As illustrated in FIGS. 3 and 4, disc 4 is mounted for rotation with shaft 3.

In another preferred form of the invention, pulley 1 is a steerable pulley mounted on shaft 3 and disc 4 is constructed from a torque transmitting material.

Steerable pulley 1 of the present invention is mounted for conjoint rotation with drive shaft 3 by means 8 illustrated in FIG. 5. A sleeve member 7 is coaxially mounted on drive shaft 3 and key 53 inserted through slot 54 in sleeve 7 mechanically interlocks with groove 55 in shaft 3 and key slot opening 56 in disc 4. Disc 4 is formed with an opening 9 for receiving sleeve 7 therethrough and has annular radially inner and outer bearing surfaces 10 and 11. As an alternative to the use of a sleeve member 7 and key 53, joint rotation of pulley 1 on shaft 3 may be effected by use of an axle and spline joint means.

A pair of first and second collars 12 and 13 are coaxially mounted on sleeve 7 on opposite sides of disc 4. First and second collars 12 and 13 are formed with means 14 for conjoint rotation of the collars 12 and 13 with sleeve 7. Means 14 consists of clamping collar 12 as a split ring. A bore 57 on one side of the joint 58 of collar 12 is formed in alignment with a threaded bore (not shown) on the other side of joint 58 for the insertion of threaded bolt 60. Insertion and tightening of bolt 60 clamps the inside annular surface 61 of collar 12 against the outside surface 62 of sleeve 7. A slot opening 68 in collar 12 interlocks with key 53.

Collars 12 and 13 clamp the radially inner bearing surfaces 10 of disc 4 using clamping means 15 such as threaded fasteners 63 dimensioned for insertion through openings 64 in collar 12, through openings 65 in disc 4 and into threaded openings 66 in collar 13. Collar 13 is also formed with a slot opening 67 for mechanical interlock with key 53.

The steerable pulley 1 includes male and female rim members 16 and 17 mounted for rotation with drive shaft 3 which are formed with mating peripheral pulley belt receiving surfaces 18 and 19. The female rim member 17 is formed with an annular clamping surface 20 dimensioned for receiving the annular outer bearing surface 11 of disc 4.

A clamp ring 21 is dimensioned for clamping annular outer bearing surface 11 of disc 4 against annular clamping surface 20. Threaded fasteners 44 inserted through openings 45 in clamp ring 21, through openings 48 in disc 4, and threadably inserted in threaded openings 46 in female rim member 17 clamp annular outer bearing surface 11 of disc 4 to annular clamping surface 20 formed in female rim member 17.

Female rim member 17 is releasably joined to male rim member 16 by means 22 such as threaded fasteners 40 inserted through openings 41 in male rim member 16, through openings 42 in clamp ring 21, through openings 47 in disc 4 and into threaded openings 43 in female rim member 17.

Steerable pulley 1 is preferably mounted on ball bearing members 23 and 24. Male and female rim members 16 and 17 are formed with annular flanges 25 and 26 coaxial with the rim members 16 and 17 for receiving the inner races 49 and 50 of ball bearing members 23 and 24 and frame 2 includes annular members 35 and 36 receiving the outer races 51 and 52 of ball bearing members 23 and 24.

A preferred use of the steerable pulley 1 of the present invention is in a conveyor 38 illustrated in FIG. 1 which consists briefly of a drive shaft 3 driven by motor 73; an elongated frame 27; a drive pulley 1 mounted on one end 28 of elongated frame 27 and operably connected to drive shaft 3 for rotation therewith including a rotatable transmission member 4 operably connected to drive shaft 3; the drive pulley 1 including a rim 5 operably connected to the rotatable transmission member 4 radially from the drive shaft 3; the rotatable transmission member 4 is formed from a material which permits the rotatable transmission member to elongate radially and to flex laterally in relation to the axis of rotation 6 of shaft 3; a belt 29 mounted on rim 5 of the drive pulley 1; an idler shaft 30 spaced from drive shaft 3; an idler pulley 31 having an axis of rotation 33 mounted on the other end 32 of elongated frame 27 and operably connected to idler shaft 30 for rotation thereon; and idler pulley 31 including a rim 34 positioned for receipt of belt 29.

Conveyor 38 as illustrated in FIG. 1 includes a drive pulley 1 which is a steerable pulley as illustrated in FIGS. 3–5.

As illustrated in FIG. 1, conveyor 39 includes a plurality of steerable drive pulleys 1, 1', and 1" mounted on frames 2, 2' and 2" attached to elongated frames 27, 27' and 27" for driving by drive shaft 3; a plurality of idler pulleys 31, 31', and 31" mounted on idler shafts 30, 30' and 30"; and a plurality of belts 29, 29', and 29" each mounted for travel between pairs of steerable drive pulleys 1, 1', and 1" and rims 34, 34' and 34" of idler pulleys 31, 31', and 31".

Directional change of the conveyors 38, 38' and 38" may be effected by manually moving the conveyors or conveyor 39 may be provided with means (not shown) operably attached to the other ends 32, 32' and 32" of the elongated frames 27, 27', and 27" for moving the elongated frames 27, 27' and 27" laterally.

Although the primary use of the present invention is in belt driven pulleys as illustrated in FIG. 1 in which only one pulley 1 is steerable, in some applications the idler pulley 31 may also be a steerable pulley.

In those applications where conveyor 38 is formed with two steerable pulleys, drive pulley 1 is constructed as previously described and as illustrated in FIGS. 3–5. For purposes of brevity, and because construction is identical, the steerable pulley substituted for idler pulley is not illustrated or further described. In place of idler pulley 31, a steerable pulley as previously described and illustrated in FIGS. 3–5 would be substituted. Instead of idler shaft 30 with its fixed axis at right angles to the plane of rotation of the idler pulley 31, shaft 30 could be moved to angles other than right angles to the plane of the pulley 31.

In another form of the invention, conveyor 39 as previously described may also consist of a plurality of steerable drive pulleys 1, 1', and 1" mounted on drive shaft 3; a plurality of idler pulleys 31, 31', and 31" mounted on idler shafts 30, 30' and 30"; and a plurality of belts 29, 29', and 29" each mounted for travel between pairs of steerable drive pulleys 1, 1' and 1" and idler pulleys 31, 31', and 31". In this form of the invention, idler pulleys 31, 31' and 31" are not individually described or illustrated as they are identical to the steerable pulleys 1, 1', and 1". Idler shafts 30, 30', and 30" are not separately described or illustrated as they would be similar to the drive shaft 3.

Another form of rotatable transmission member or disc 4' is illustrated in FIG. 8. In this form of the invention, the disc 4' is formed with an obround shape, but other geometric shapes could also be used.

The disc 4' is formed with an opening 9', and a key opening 56' for the receipt of a key member 53. Openings 65' should also be formed for the passage of fasteners such as fasteners 63 therethrough. Other openings 47' and 48' should also be formed in the disc 4' for the receipt of threaded bolts such as bolts 44 through openings 48'. Other openings 47' should be formed in disc 4' for the receipt of threaded bolts 40 therethrough. The disc need not be a membrane, but could also consist of a plurality of spokes. In every case, the membrane or spoked disc 4 or 4' would necessarily be made from a material capable of stretching or elongating radially and flexing laterally in relation to the axis of rotation 6 of the shaft 3.

Annular radially inner bearing surfaces 10' for clamping by collars 12 and 13 as well as radially outer bearing surface 11' for receipt of a clamp member such as clamp 21 are also provided.

Assembly of the pulley of the present invention is as follows:

Locate first collar 12, and key 53 onto sleeve member 7. Install disc 4 over sleeve member 7 and clamp between first collar 12 and second collar 13. Insert the foregoing assembly consisting of first collar 12, second collar 13, disc 4 sleeve member 7 and key 53 into female rim member 17. Clamp disc 4 with clamp ring 21 against annular clamping surface 20 of female rim member 17. Assemble male rim member 16 onto female rim member 17, and finally assemble bearing members 23 and 24 on annular flanges 25 and 26.

A disc 4 may be made from a material such as flat belting material which must be capable of stretching radially and flexing laterally to its axis of rotation. The materials needed for constructing the disc will depend on several factors such as torque load, rotational speed, and pulley size. As an example, Polymate PM120® made by the Globe Company may be used for a multiple ply disc having about a 5.7" diameter, for conveying cardboard sheet material in stacking machines at a speed of about 1000' per minute. Preferable the discs are reinforced and each ply of the disc is bonded so that the reinforcing is set at an angle to the reinforcing in an adjacent ply.

Operation of the pulley 1 of the present invention may be seen by referring to FIGS. 3 and 4. When the axis 6 of shaft 3 is at right angles to the plane 77 of pulley 1 as illustrated in FIG. 3, disc 4 will lie in the plane 77 of pulley 1 and be at a right angle to axis 6 of shaft 3. In this configuration of the shaft 3 and pulley 1, disc 4 will rotate on shaft 3 and transmit torque to rim 5 of pulley 1 while remaining in a flat plane coincident with plane 77 of pulley 1 as illustrated in FIG. 3.

When, however, axis 6 of shaft 3 is not at a 90° angle to plane 77 of pulley 1, but rather is at an angle 78 as shown in FIG. 4, disc 4 no longer rotates in a flat plane. Instead, the plane of disc 4 is constantly flexing and stretching as disc 4 rotates. For example, referring to FIG. 4, when the axis 6 of shaft 3 is skewed at an angle 78 from a reference plane 79 which intersects plane 77 of pulley 1 at a 90° angle, the peripheral edges of disc 4 (annular radially outer bearing surface of disc 4) are held by clamp ring 21 in pulley 1 in plane 77 while the annular radially inner bearing surface 10 of disc 4 skews at an angle 78 to axis 6 of shaft 3. This condition causes the right side of disc 4 as shown in FIG. 4 to flex upwardly at an angle 80 from a straight line 81 and the left side of disc 4 to flex downwardly at a similar angle 82 from a straight line 83. Straight line 81 is drawn at a 90° angle from axis 6 of shaft 3 and straight line 83 is also drawn at a 90° angle to axis 6 of shaft 3. It is to be understood that as disc 4 rotates, it is constantly flexing. As stated previously, as disc 4 is flexing from a flat plane, it is continually being stretched in a radial direction.

FIG. 1 illustrates one use of the pulley 1 and conveyor 39 of the present invention. Where it is desirable to cause lateral separation between adjacent sheet members 75 and 76 as they enter conveyor 39 traveling in the direction of arrows 84, it is necessary to cause adjacent conveyors 38' and 38" to diverge. By moving end 32' of conveyor 38' in the direction of arrow 85 and end 32" of conveyor 38" in the direction of arrow 86, so that the downstream ends of the conveyors are wider apart than the upstream ends, sheets 75' and 76' will laterally separate as they are conveyed and will assume the laterally separated positions as shown. Separation of sheets in this manner has long been practiced with round belts because it was not necessary to steer the drive pulleys parallel to the direction of the belts. It was not possible, however, to use flat belts except with the use of very complicated mechanically expensive drive pulleys, as described in U.S. Pat. No. 1,454,657, which could be steered in the direction of the belts. Thus when belt conveyor 38' is moving in the direction of arrow 87 and belt conveyor 38" is moving in the direction of arrow 88, pulleys 1' and 1" are at an angle to shaft 3 which is other than a 90° angle. This angular relationship of pulleys 1' and 1" is made possible by the teachings of the present invention described above.

On the other hand, when adjacent articles such as sheets of material approach converging conveyors 38 and 38' which travel in converging directions as shown by arrows 89 and 87, such sheets or articles converge as they travel along the length of the two conveyors.

A feature of the present invention is the fact that the drive pulley 1 as previously described may be adjustably slid along the drive shaft 3 and operate at infinite locations along the drive shaft 3. Referring to FIG. 1 it may be seen that sheets or packages 75 and 76 may be different widths so that the conveyors 38, 38' and 38" may be adjusted to be closer or further apart. Such adjustments may be made by simply pushing or pulling on the conveyors 38, 38' and 38" in the direction of arrows 90–95.

The only structural change needed to accomplish this sliding feature is to form groove 55 in shaft 3 a distance equal to the desired sliding distance of the pulleys 1. Another way to effect sliding of drive pulley 1 along the drive shaft 3 is to form splines in drive shaft 3 and to provide registering spline fittings in sleeve 7.

The steerable pulley member described above is only one form of steerable rotary member which utilizes the teachings of the present invention. The steerable rotary member may also be a steerable sprocket in which the rim member has a toothed chain receiving surface for driving a chain. All other parts of the device are identical to the parts described in the steerable pulley member.

The steerable pulley member described above may also be a steerable timing gear in which the rim member has a toothed gear belt receiving surface for driving a toothed timing gear belt. All other parts of the device are identical to the parts described in the steerable pulley member.

Steerable timing gear 101 is illustrated in FIGS. 9–11. For purposes of easily and quickly comparing the steerable timing gear 101 with the steerable pulley illustrated in FIGS. 1–8 and previously described, identical numbers have been assigned to identical parts and to identical portions of closely related parts. For example, clamp ring 21 illustrated in FIG. 11 is identical to clamp ring 21 illustrated in FIG. 5, and openings 45 in FIG. 11 are identical to openings 45 in FIG. 5 and serve the same function of receiving threaded fasteners 44 therethrough illustrated in FIGS. 11 and 5. In like manner, annular clamping surface 20 formed in female rim member 117 is identical to annular clamping surface 20 formed in female rim member 17 shown in FIG. 5. Annular clamping surface 20 of female rim member 117 in FIG. 11 also has the same purpose as the annular clamping surface 20 of female rim member 17 illustrated in FIG. 5; viz. the receipt of annular radially outer bearing surface 11 of disc 4 clamped by clamp ring 21.

It should also be noted that where a new member or part of a member forming the steerable timing gear 101 illustrated in FIGS. 9–11 has a different but related structure or function from the steerable pulley illustrated in FIGS. 1–8, the convenient expedient of using the same number used in FIGS. 1–8, within a one hundred series in FIGS. 9–11 has been used. For example, steerable timing gear 101 has a different structure from the steerable pulley 1 illustrated in FIG. 7, but the inventive concept is identical so the steerable timing gear in FIG. 9 carries the number "one hundred and one" (101).

Identical parts having identical numbers are not described again for purposes of brevity.

It is apparent from the illustrations in FIGS. 9–11 that the steerable timing gear 101 is identical in structure and function to steerable pulley 1 previously described and illustrated in FIGS. 1–8 except that instead of having smooth annular pulley belt receiving surfaces 18 and 19, male and female rim members 116 and 117 are formed with gear teeth 118 and 119 respectively for driving a toothed timing gear belt (not shown).

FIGS. 10 and 11 illustrate another variation of the present invention. Instead of the rotatable transmission member or disc 4 being constructed as a unitary member or a plurality of plies of material bonded together as a unitary member, two entirely separate discs 4 which are not bonded together are used. More than two separate discs 4 could be used, but only two are shown for purposes of illustration.

It should be noted that the use of two or more entirely separate discs 4 is not limited to the timing gear illustrated in FIGS. 9–11. The steerable pulley 1 illustrated in FIGS. 1–8 could also be constructed from two or more entirely separate discs 4.

The function of the steerable timing gear 101 is identical to the function of the steerable pulley 1 illustrated in FIGS. 1–8. Specifically, when a shaft, not shown, on which sleeve 7 may be mounted and connected by key 53 is pivoted at an angle with respect to the axis of rotation of male and female rim members 116 and 117, discs 4 in FIG. 11 flex laterally and axially in the same manner as disc 4 illustrated in FIG. 4. Thus if the axis of rotation of timing gear 101 is angled with respect to the axis of rotation 6 of a drive shaft, not shown, the steerable timing gear 101 may still be rotated by a drive shaft, not shown, and a timing belt, not shown, will remain on steerable timing gear 101.

The steerable pulley member described above may also be a steerable sprocket gear in which the rim member has a toothed chain receiving surface for driving a chain. All other parts of the device are identical to the parts described in the steerable pulley member.

Steerable sprocket gear 201 is illustrated in FIGS. 12–14. For purposes of easily and quickly comparing the steerable sprocket gear 201 with the steerable pulley illustrated in FIGS. 1–8 and previously described, identical numbers have been assigned to identical parts and to identical portions of closely related parts. For example, clamp ring 21 illustrated in FIG. 14 is identical to clamp ring 21 illustrated in FIG. 5, and openings 45 in FIG. 14 are identical to openings 45 in FIG. 5 and serve the same function of receiving threaded fasteners 44 therethrough illustrated in FIG. 14 and 5. In like manner, annular clamping surface 20 formed in female rim member 217 is identical to annular clamping surface 20 formed in female rim member 17 shown in FIG. 5. Annular clamping surface 20 of female rim member 217 in FIG. 14 also has the same purpose as the annular clamping surface 20 of female rim member 17 illustrated in FIG. 5; viz. the receipt of annular radially outer bearing surface 11 of disc 4 clamped by clamp ring 21.

It should also be noted that where a new member or part of a member forming the steerable sprocket gear 201 illustrated in FIGS. 12–14 has a different but related structure or function from the steerable pulley illustrated in FIGS. 1–8, the convenient expedient of using the same number used in FIGS. 1–8, within a two hundred series in FIGS. 12–14 has been used. For example, steerable sprocket gear 201 has a different structure from the steerable pulley 1 illustrated in FIG. 7, but the inventive concept is identical so the steerable sprocket gear in FIG. 12 carries the number "two hundred and one" (201).

Identical parts having identical numbers are not described again for purposes of brevity.

It is apparent from the illustrations in FIGS. 12–14 that the steerable sprocket gear 201 is identical in structure and function to steerable pulley 1 previously described and illustrated in FIGS. 1–8 except that instead of having smooth annular pulley belt receiving surfaces 18 and 19, male or female rim members 216 or 217 (preferably female rim member 217) is formed with teeth 219 respectively for driving a chain (not shown).

FIGS. 13 and 14 illustrate another variation of the present invention. Instead of the rotatable transmission member or disc 4 being constructed as a unitary member or a plurality of plies of material bonded together as a unitary member, two entirely separate discs 4 which are not bonded together are used. More than two separate discs 4 could be used, but only two are shown for purposes of illustration.

The function of the steerable sprocket gear 201 is identical to the function of the steerable pulley 1 illustrated in FIGS. 1–8. Specifically, when a shaft, not shown, on which sleeve 7 may be mounted and connected by key 53 is pivoted at an angle with respect to the axis of rotation of male and female rim members 216 and 217, discs 4 in FIG. 13 flex laterally and axially in the same manner as disc 4 illustrated in FIG. 4. Thus if the axis of rotation of sprocket gear 201 is angled with respect to the axis of rotation 6 of a drive shaft, not shown, the steerable sprocket gear 201 may still be rotated by a drive shaft, not shown, and a chain, not shown, will remain on steerable sprocket gear 201.

Referring to FIGS. 15–17, the steerable pulley 301 illustrated is identical to the steerable pulley 1 illustrated in FIGS. 3–5 except that instead of a planar rotatable transmission member or disc 4, the disc 304 has a corrugated profile including a plurality of concentric alternating ridges 96 and valleys 97. A slotted opening 56 may be formed in disc 304. All other parts of the device are identical to the parts described in the steerable pulley member illustrated in FIGS. 3–5.

The steerable pulley member illustrated in FIGS. 15–17 may also be a steerable timing gear as illustrated in FIGS. 9–11 and described above, or may be a toothed gear belt receiving surface for driving a toothed timing gear belt as illustrated in FIGS. 12–14 and illustrated above.

For purposes of easily and quickly comparing the steerable pulley 301 illustrated in FIGS. 15–17 with the steerable pulley 1 illustrated in FIGS. 1–8, the steerable timing gear 101 illustrated in FIGS. 9–11 and the steerable sprocket 201 illustrated in FIGS. 12–14, identical numbers have been assigned to identical parts and to identical portions of closely related parts.

It should also be noted that where a new member or part of a member forming the steerable pulley 301 illustrated in FIGS. 15–17 has a different but related structure or function from the steerable pulley illustrated in FIGS. 1–8, the convenient expedient of using the same number used in FIGS. 1–8, within a three hundred series in FIGS. 15–17 has been used. For example, 304 has a different structure from the disc 4 illustrated in FIG. 5, but the inventive concept is identical so the disc in FIGS. 16 and 17 carries the number "three hundred and four" (304). Identical parts having identical numbers are not described again for purposes of brevity.

Operation of the pulley 301 illustrated in FIGS. 15–17 is identical to the operation of steerable pulley 1 illustrated in FIGS. 3–5 and previously described. When the axis 6 of shaft 3 is skewed at an angle from a reference plane which intersects the plane of pulley 301 at an angle other than 90°, disc 304 will be constantly flexing. As disc 304 is flexing from a flat plane, it is continually being stretched in a radial direction. Because disc 304 is corrugated, when the disc 304 stretches radially, the steepness of the concentric ridges 96 and valleys 97 will straighten to a selected degree depending on the skew of the axis 6 of shaft 3 to pulley 301.

I claim:

1. A steerable rotary member comprising:
   a. a rotatable mounting member;
   b. a rim member disposed from said rotatable mounting member and formed with a force transmitting surface; and
   c. a rotatable torque transmitting member formed as a thin planar member and from a material which permits radial stretching and lateral flexing and is connected to said rotatable mounting member and said rim member so that the pivot point of said steerable rotary member is at the center of said steerable rotary member.

2. A steerable pulley comprising:
   a. a rotatable mounting member;
   b. a rim member disposed from said rotatable mounting member and formed with a pulley belt receiving surface; and
   c. a rotatable torque transmitting member formed as a thin planar member and from a material which permits radial stretching and lateral flexing and is connected to said rotatable mounting member and said rim member so that the pivot point of said steerable pulley is at the center of said steerable pulley.

3. A steerable sprocket comprising:
   a. a rotatable mounting member;
   b. a rim member disposed from said rotatable mounting member and formed with a toothed chain receiving surface; and
   c. a rotatable torque transmitting member formed as a thin planar member and from a material which permits radial stretching and lateral flexing and is connected to said rotatable mounting member and said rim member so that the pivot point of said steerable sprocket is at the center of said steerable sprocket.

4. A steerable timing gear comprising:
   a. a rotatable mounting member;
   b. a rim member disposed from said rotatable mounting member and formed with a toothed gear belt receiving surface; and
   c. a rotatable torque transmitting member formed as a thin planar member and from a material which permits radial stretching and lateral flexing and is connected to said rotatable mounting member and said rim member so that the pivot point of said steerable rotary member is at the center of said steerable timing gear.

5. A steerable pulley mounted for rotation in a frame and operably connected to a shaft in adjustable angular relation thereto comprising:
   a. a rotatable transmission member operably connected to said shaft;
   b. said steerable pulley including a rim operably connected to said rotatable transmission member radially from said shaft; and
   c. said rotatable transmission member is formed as a thin planar member and from a material which permits said rotatable transmission member to stretch radially and to flex laterally in relation to the axis of rotation of said shaft so that the pivot point of said steerable pulley is at the center of said steerable pulley.

6. A pulley as described in claim 5 wherein:
   a. said rotatable transmission member is a disc.

7. A pulley as described in claim 6 wherein:
   a. said disc is mounted for rotation with said shaft.

8. A steerable pulley as described in claim 7 wherein:
   a. said disc is constructed from a torque transmitting material.

9. A steerable pulley as described in claim 8 wherein:
   a. said shaft is a drive shaft.

10. A steerable pulley mounted for rotation and operably connected to a shaft in adjustable angular relation thereto comprising:
    a. a rotatable transmission member operably connected to said shaft;
    b. said steerable pulley including a rim operably connected to said rotatable transmission member radially from said shaft;
    c. said rotatable transmission member is formed as a thin planar member and from a material which permits said rotatable transmission member to stretch radially and to flex laterally in relation to the axis of rotation of said shaft so that the pivot point of said steerable pulley is at the center of said steerable pulley;
    d. annular bearing members;
    e. said pulley rim member is formed with annular flanges coaxial with said rim members for receiving said bearing members; and
    f. means supporting said bearing members.

11. A steerable pulley mounted for rotation in a frame and operably connected to a drive shaft in adjustable angular relation thereto comprising:
    a. a rotatable transmission member operably connected to said drive shaft;
    b. said pulley including a rim operably connected to said rotatable transmission member radially from said drive shaft;
    c. said rotatable transmission member is a disc constructed from a torque transmitting material mounted for rotation with said drive shaft and is formed from a material which permits said rotatable transmission member to stretch radially and to flex laterally in relation to the axis of rotation of said drive shaft;
    d. a sleeve member coaxially mounted on said drive shaft;
    e. means connecting said drive shaft and said sleeve member for conjoint rotation;
    f. said disc is formed with an opening for receiving said drive shaft therethrough and having annular radially inner and outer bearing surfaces;
    g. a pair of first and second collars coaxially mounted on said drive shaft on opposite sides of said disc;
    h. said first and second collars are formed with means for conjoint rotation of said collars with said drive shaft;
    i. said collars being formed with means clamping said radially inner bearing surfaces of said disc therebetween for conjoint rotation;

j. said steerable pulley includes male and female rim members mounted for rotation with said drive shaft and formed with mating peripheral pulley belt receiving surfaces;

k. said female rim member is formed with an annular clamping surface dimensioned and receiving said annular outer bearing surface of said disc;

l. a clamp ring dimensioned for bearing against said annular outer bearing surface of said disc;

m. means releasably joining said male rim member to said female rim member; ; and n. means joining said clamp ring to said annular clamping surface of said female rim member.

12. A conveyor comprising:

a. a drive shaft;

b. an elongated frame;

c. a drive pulley mounted on one end of said elongated frame and operably connected to said drive shaft for rotation therewith including a rotatable transmission member operably connected to said drive shaft;

d. said drive pulley including a rim operably connected to said rotatable transmission member radially from said drive shaft;

e. said rotatable transmission member is formed from a material which permits said rotatable transmission member to stretch radially and to flex laterally in relation to the axis of rotation of said shaft;

f. a belt mounted on said rim of said drive pulley;

g. an idler shaft spaced from said drive shaft;

h. an idler pulley mounted on the other end of said elongated frame and operably connected to said idler shaft for rotation thereon; and i. said idler pulley including a rim positioned for receipt of said belt.

13. A conveyor as described in claim 12 comprising:

a. said drive pulley is a steerable pulley operably connected to said drive shaft in adjustable angular relation thereto.

14. A conveyor as described in claim 13 comprising:

a. a plurality of steerable drive pulleys mounted on said drive shaft;

b. a plurality of idler pulleys mounted on idler shafts; and c. a plurality of belts each mounted for travel between pairs of said steerable drive pulleys and said idler drive pulleys.

15. A conveyor as descried in claim 12 wherein:

a. said idler pulley is a steerable pulley operably connected to said idler shaft in adjustable angular relation thereto.

16. A conveyor comprising:

a. a drive shaft;

b. an elongated frame;

c. a drive pulley mounted on one end of said elongated frame and operably connected to said drive shaft for rotation therewith including a rotatable transmission member operably connected to said drive shaft;

d. said drive pulley including a rim operably connected to said rotatable transmission member radially from said drive shaft;

e. said rotatable transmission member is formed from a material which permits said rotatable transmission member to stretch radially and to flex laterally in relation to the axis of rotation of said shaft;

f. a belt mounted on said rim of said drive pulley;

g. an idler shaft spaced from said drive shaft;

h. an idler pulley mounted on the other end of said elongated frame and operably connected to said idler shaft for rotation thereon and including a rotatable member formed from a material which permits said rotatable member to stretch radially and to flex laterally in relation to the axis of said idler shaft; and i. said idler pulley including a rim operably connected to said rotatable member radially from said idler shaft and positioned for receipt of said belt.

17. A conveyor as described in claim 16 comprising:

a. a plurality of steerable drive pulleys mounted on said drive shaft;

b. a plurality of idler pulleys mounted on idler shafts; and c. a plurality of belts each mounted for travel between pairs of said steerable drive pulleys and said idler pulleys.

18. A drive pulley mounted for rotation with a drive shaft formed with an elongated key slot therein comprising:

a. a sleeve member coaxially mounted on said drive shaft for axial sliding thereon and rotation therewith and formed with a key opening therethrough in registration with said elongated key slot;

b. a rotatable transmission member formed from a material which permits said rotatable transmission member to stretch radially and to flex laterally in relation to the axis of rotation of said drive shaft;

c. means joining said rotatable transmission member to said sleeve member for rotation and axial sliding movement therewith including a key member inserted through said key opening and registering with said key slot in said drive shaft; and d. said pulley including a rim connected to said rotatable transmission member radially from said drive shaft and mounted for rotation in a plane at right angles to the axis of rotation of said drive shaft and in planes at angles other than right angles to the axis of rotation of said drive shaft.

19. A drive pulley mounted for rotation with a drive shaft formed with a spline therein comprising:

a. a splined sleeve member coaxially mounted on said drive shaft for axial sliding thereon and rotation therewith and formed with splines in registration with said splines of said drive shaft;

b. a rotatable transmission member formed from a material which permits said rotatable transmission member to stretch radially and to flex laterally in relation to the axis of rotation of said drive shaft;

c. means joining said rotatable transmission member to said splined sleeve member for rotation and axial sliding movement therewith; and d. said pulley including a rim connected to said rotatable transmission member radially from said drive shaft and mounted for rotation in a plane at right angles to the axis of rotation of said drive shaft and in planes at angles other than right angles to the axis of rotation of said drive shaft.

20. A steerable pulley as described in claim 11 comprising:

a. bearing members;

b. said male and female rim members are formed with annular flanges coaxial with said rim members for receiving said bearing members;

c. said frame includes annular members receiving said bearing members; and d. said disc includes a plurality of mating discs.

* * * * *